July 12, 1966  R. S. WHITTEN, JR  3,260,289
SABER SAW ATTACHMENT
Filed Feb. 5, 1964
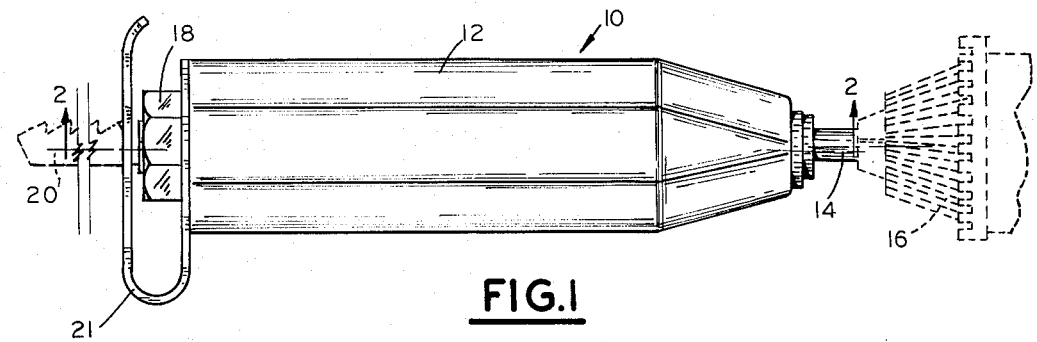
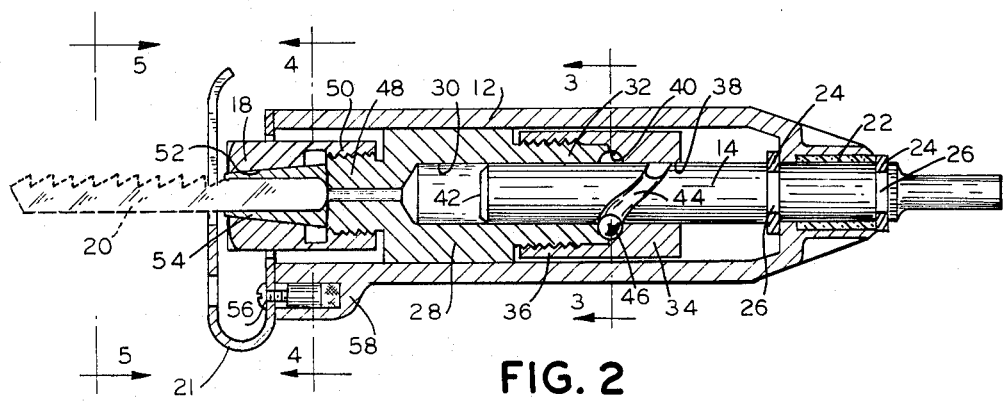
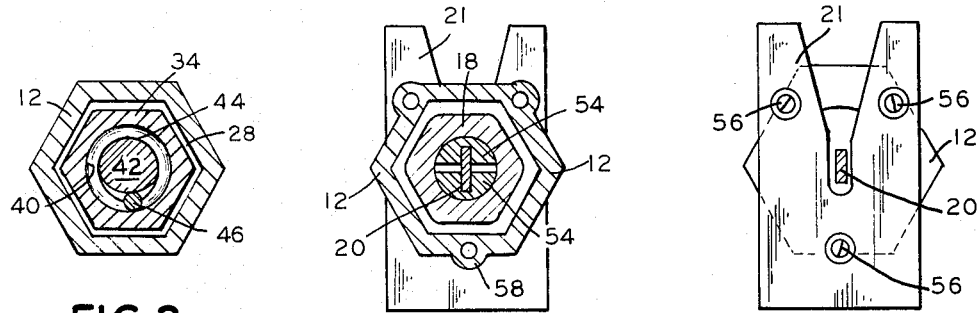
INVENTOR.
RICHARD S. WHITTEN JR
BY
ATTORNEYS

United States Patent Office 3,260,289
Patented July 12, 1966

3,260,289
SABER SAW ATTACHMENT
Richard S. Whitten, Jr., Fort Worth, Tex., assignor to Liberty Manufacturing Co., Inc., Fort Worth, Tex., a corporation of Texas
Filed Feb. 5, 1964, Ser. No. 342,641
8 Claims. (Cl. 143—68)

This invention relates to a reciprocating tool device. More particularly, the invention relates to a saber saw attachment device. Still more particularly, the invention relates to a device for actuation of a reciprocating tool, such as a saber saw blade, by means of rotary applied motion, such as from a hand drill.

An object of this invention is to provide a device for the conversion of rotary motion to reciprocating motion.

Another object of this device is to provide a tool adaptable to receive rotary motion, such as applied by a hand drill, and to convert such rotary motion into reciprocating motion for the actuation of tools, such as a saber saw blade.

Another object of this invention is to provide a saber saw attachment for a hand drill having an extending shank at one end adaptable to be affixed to a drill and including means at the other end of the tool for affixing a saber saw blade and including means within the tool for the reciprocal actuation of the saber saw blade upon rotary movement applied to the shank.

Another object of this invention is to provide an improved saber saw attachment including means whereby upon rotation of an extending shank reciprocal motion is applied to a piston by means of a ball bearing.

Another object of this invention is to provide a saber saw attachment having greatly improved means of converting rotating motion to reciprocating motion.

Another object of this invention is to provide a saber saw attachment including a rotatable shaft having a circumferential angularly displaced ball bearing raceway in the exterior surface thereof adaptable to receive one-half of a ball bearing and a piston reciprocable within the tool having an interior circumferential ball bearing raceway adaptable to receive the other half of the ball bearing whereby upon rotation of the shaft said ball bearing rotates in said raceway in said shaft and in said raceway in said piston to impart reciprocal motion to the piston.

These and other objects and a better understanding of the invention may be had by referring to the following description and claims taken in conjunction with the attached drawings, in which:

FIGURE 1 is an external view of an embodiment of the saber saw attachment of this invention.

FIGURE 2 is a cross-sectional view taken along the line 2—2 of FIGURE 1.

FIGURE 3 is a cross-sectional view taken along the line 3—3 of FIGURE 2.

FIGURE 4 is a cross-sectional view taken along the line 4—4 of FIGURE 2.

FIGURE 5 is an end view of the saber saw attachment of this invention taken along the line 5—5 of FIGURE 2.

This invention may be described as an improved saber saw attachment. More particularly, but not by way of limitation the invention may be defined as a saber saw attachment comprising a hollow housing member open at each end, a piston member slidably and non-rotatably supported within said housing, said piston member having means at the first end for removably receiving a saber saw blade or the like, said piston member having a central, longitudinal opening in the second end thereof, said opening having a substantially semi-circular, cross-sectioned bearing raceway formed therein, said raceway positioned substantially in a plane perpendicular the longitudinal axis of said piston member, a shaft member rotatably supported in said housing member, said shaft member having a portion thereof extending exteriorly of one end of said housing and having the other end thereof extending slidably within said longitudinal opening in said piston member, said shaft member having a circumferential substantially semi-circular, cross-sectioned raceway formed in the exterior surface thereof, said raceway positioned substantially in a plane at an angle to the axis of said shaft, and a ball bearing positioned within said piston raceway and said shaft raceway.

Referring now to the drawings and first to FIGURE 1, the saber saw attachment of this invention is indicated generally by the numeral 10. The device consists of a body portion 12 having at one end thereof an extending shaft 14. Shown affixed to the shaft 14 in dotted view is a chuck 16 of a typical electric hand drill showing means whereby the saber saw attachment of this invention may be affixed to a typical hand drill, it being understood that any other method of rotation, including an integrally supported motor affixed to body 1 would nevertheless be within the purview of this invention.

Extending from body 12 opposite the end supporting shaft 14 is a chucking nut 18 by which a saber saw blade 20, shown dotted, is supported. The function of the saber saw attachment 10 is to convert rotary motion supplied, such as by a hand drill chuck 16 to shaft 14, into reciprocating motion applied to chucking nut 18 to a working tool, such as a saw blade 20. It is understood that the saw blade 20 forms no part of the invention and the device may be utilized for the production of reciprocating motion for any other use or application and for any other type tool other than a saw blade.

Saber saw attachment 10 includes the provision of a foot portion 21 by which the tool is supported in proper contact with material being sawed.

The body portion 12 may have a variety of external configurations. The configuration shown is hexagonal to conform, as will be described subsequently, with the preferred internal cross-sectional configuration, however it is understood that the external configuration of the device is completely optional.

Referring to FIGURE 2, the internal arrangement of the invention is best shown. Body portion 12 is basically an elongated hollow member open ended. At one open end is supported a bearing 22 which rotatably received the shaft 14. Bearing 22 is preferably of a bronze or other bearing material. Split retaining rings 24, positioned in grooves 26 formed in the shaft 14, support the shaft in a table but longitudinally fixed position relative to body 12.

Slidably positioned within body 12 is a piston 28 having a cylindrical central opening 30 in one end thereof which rotatably and slidably receives the end of shaft 14. The inward end of piston 28 is provided with a reduced diameter externally threaded portion 32 which threadably receives a retainer nut 34 having an internally threaded portion 36 at one end thereof. The retainer nut 34 is provided with an axial opening 38 which rotatably and slidably receives shaft 14.

Both the piston 28 and the retainer nut 34 are provided quarter-circular cross-sectioned bearing raceway formed in a plane substantially perpendicular of the axis of the cylindrical openings 30 and 38 so that when assembled, a semi-circular, cross-sectioned internal bearing raceway 40 in a plane perpendicular to the axis of openings 30 and 38 is provided.

Formed in the exterior surface of shaft 14, and in an area spaced from the internal end 42 of the shaft, is semi-circular, cross-sectioned external bearing raceway 44. The raceway 44 is positioned substantially in a plane at an angle to the axis of the shaft 14. In a preferred embodiment the raceway 44 is preferably substantially a convolute of a sine wave.

Positioned within both the internal raceway 40 and the external raceway 44 is a ball bearing 46.

One end of the piston 28 is provided with a reduced diameter externally threaded portion 48 which threadably receives chucking nut 18 having an internally threaded portion 50. The chucking nut 18 is provided with an internally tapered cylindrical opening 52 which slidably receives chucking dogs 54. The dogs 54 in turn receive a tool, such as saw blade 20, in a manner such that as chucking nut 18 is threadably advanced on the piston 28 the chucking dogs 54 are squeezed in firm contact with the blade 20.

The foot portion 21 is preferably of a relatively thin spring-like material of U-shaped configuration supported by screws 56 to the body 12. Body 12 may be provided with integrally cast external bosses 58 to receive the screws 56.

The configuration of the foot portion 21 is best shown in FIGURE 5.

In order for the rotation of shaft 14 to provide reciprocating motion to piston 32, the piston must be held reciprocably, but non-rotatably by body 12. This may be accomplished in a variety of ways, but the preferred embodiment, as illustrated in FIGURES 3 and 4, include the provision of a cast body 12 having a substantially octagonal cross-sectional internal configuration to receive a substantially octagonal externally configurated piston 28. This arrangement permits the piston 28 to reciprocate easily within the body 12 but prevents its rotation.

Many alternate means are obviously available to slidably and non-rotatably support the piston 32 within the body 12, such as placing internal splines (not shown) in the body 12 to engage longitudinal grooves (also not shown) formed in the piston 28.

*Operation*

When rotary motion is supplied to the end of shaft 14 extending from the body 12, the shaft freely rotates within the body 12, supported by the bearing 26, piston 28, and retainer nut 34. As the shaft 14 rotates, raceway 44 acts on ball bearing 46, so that the ball bearing rotates around the shaft. Since the plane of the external raceway 44 in shaft 14 is in a plane displaced at an angle relative to the axis, ball bearing 46 is displaced back and forth longitudinal of the axis of shaft 14. Ball bearing 46, as it rotates in raceway 44, also rotates in the semicircular internal raceway 40 formed conjointly in the piston 28 and retainer nut 34. This imparts a reciprocating motion to piston 28. The reciprocating motion is achieved by a rotating element, that is ball bearing 46, rather than by a sliding or frictional engagement as is contemplated in other known types of saber saw attachment devices.

The essence of this invention is the simplicity of construction of the device as found in the primary components, that is the shaft 14, body 12, piston 28, retainer nut 34 and ball bearing 46. The bearing arrangement whereby the shaft is rotatably supported in body 12 at one end thereof can be varied materially. The chucking arrangement whereby a blade 20 or other tool is affixed to piston 28 can also be varied materially. The invention discloses a manner of providing a saber saw attachment having great simplicity and economy of construction, but nevertheless one having superior motion converting mechanism and in addition, by means of the superiority of such mechanism, having inherently longer life and smoothness of operation.

An alternate embodiment, still within the purview of this invention, includes the provision of a double acting bearing raceway 44 in shaft 14. By double acting is meant that the raceway 44 would make two back and forth oscillations in one revolution of the shaft 14. The expression "the raceway positioned substantially in a plane at an angle to the shaft" includes such a double acting raceway. When a double acting raceway is utilized two ball bearings 46 may be utilized spaced diametrically of each other in raceways 40 and 44. Any arrangement in a saber saw attachment wherein a raceway in a rotating shaft is configured in a manner to impart reciprocating action to a ball bearing in the raceway would be within the scope of this invention.

In the description herein the provision that the shaft is rotatably supported in the body member means that it is free to rotate but will not slide longitudinally relative to the body. In like manner, when the piston is described as slidably positioned in the body is meant that it is free to slide or reciprocate but will not rotate relative to the body.

Although the invention has been described in a certain degree of particularity, it is manifested that many changes may be made in the details of construction and the arrangement of components without departing from the spirit and scope of this disclosure.

What is claimed:

1. A saber saw attachment comprising:
   a hollow housing member open at each end;
   a piston member slidably and non-rotatably supported within said housing, said piston member having means at the first end for removably receiving a saber saw blade or the like, said piston member having a central, longitudinal opening in the second end thereof, said opening having a substantially semi-circular, cross-sectioned bearing raceway formed therein, said raceway positioned substantially in a plane perpendicular the longitudinal axis of said piston member,
   a shaft member rotatably supported in said housing member, said shaft member having a portion thereof extending exteriorly of one end of said housing and having the other end thereof extending slidably within said longitudinal opening in said piston member, said shaft member having a circumferential substantially semi-circular, cross-sectioned raceway formed in the exterior surface thereof, said raceway positioned substantially in a plane at an angle to the axis of said shaft;
   and a ball bearing positioned within said piston raceway and said shaft raceway.

2. A saber saw attachment according to claim 1 wherein said body member is of a non-circular internal cross-sectional configuration and said piston member is of a substantially mating non-circular, cross-sectional configuration whereby said piston member is slidably and non-rotatably supported in said body member.

3. A saber saw attachment according to claim 1 wherein said piston member is provided with an external threaded portion at the said first end, and including
   a chucking nut having internal threads at one end thereof to threadably engage said piston member, said chucking nut having a tapered opening in the opposite end thereof, and
   a pair of substantially semi-circular cross-sectioned longitudinally tapered chuck dogs positioned in said tapered opening, said chucking dogs each having a co-mating central longitudinal blade receiving slot therein, said chucking dogs disposed towards each other by the advancement of said chucking not on said piston.

4. A saber saw attachment according to claim 1 wherein said piston is provided with external threads at the second end thereof and including
   a retainer nut internally threaded at one end thereof threadably engaged with said piston, said retainer nut having a shaft receiving axial opening therethrough, said piston at the internal shaft receiving end having a substantially quarter-circular cross-sectioned bearing raceway formed therein in a plane perpendicular the longitudinal axis thereof, and a co-mating quarter-circular cross-sectioned bearing raceway formed in the interior shaft receiving surface of said retainer nut in a plane substantially perpendicular the axis of said shaft receiving opening, said piston member and said retaining nut, when assembled, providing said subsantially semi-circular cross-sectioned bearing raceway.

5. A saber saw attachment comprising, in combination;
a hollow body member open at each end;
a piston member slidably supported within said body member adjacent one end thereof, said piston member externally threaded at one end thereof, said externally threaded end having a longitudinal shaft receiving opening therein and an internal substantially quarter-circular cross-sectionnal configured bearing raceway at said threaded end;
an internally threaded retainer nut threadably supported to said piston member, said retainer nut having a shaft receiving opening therethrough and an internal quarter-circular cross-sectional configured bearing raceway therein co-mating with said bearing raceway of said piston member to form as assembled an internal substantially semi-circular cross-sectioned bearing raceway substantially in a plane perpendicular to the longiutdinal axis of said piston member;
means of affixing a saber saw blade or the like to said piston member at the end opposite said end threaded end;
a shaft rotatably supported within said body member and extending partially exteriorly of said body member, said shaft extending rotatably and slidably within said shaft receiving openings of said piston member and said retaining nut as assmbled, said shaft having an exterior substantially semi-circular cross-sectioned bearing raceway formed therein disposed substantially in a plane at an angle to the longitudinal axis of the shaft; and
a ball bearing positioned in said semi-circular raceway formed in said piston member and said retaining nut as assembled and in said bearing raceway in said shaft.

6. A saber saw attachment according to claim 5 wherein said body member is of non-circular internal cross-sectional configuration and said piston member is of a substantially mating non-circular cross-sectional configuration whereby said piston member is slidably and non-rotatably supported in said body member.

7. A saber saw attachment according to claim 5 wherein said piston member is provided with an external threaded portion at the said first end, and including
a chucking nut having internal threads at one end thereof to threadably engage said piston member, said chucking nut having a tapered opening in the opposite end thereof, and
a pair of substantially semi-circular cross-sectioned longitudinally tapered chuck dogs positioned in said tapered opening, said chucking dogs each having a co-mating central longitudinal blade receiving slot therein, said chucking dogs disposed towards each other by the advancement of said chucking not on said piston.

8. A blade chuck for affixing a blade to a reciprocating member, comprising, in combination with said reciprocating member, said member having an externally threaded end portion;
an internally threaded chucking nut threadably engaging said reciprocating member, said chucking nut having a tapered opening therethrough, the smallest diameter of said tapered opening at the end thereof opposite said internal threads; and
a pair of substantially semi-circular cross-sectioned longitudinally tapered chuck dogs positioned in said tapered opening, and having the enlarged end thereof in engagement with the end of said reciprocating member, said chucking dogs each having a co-mating central longitudinal blade receiving slot therein, said chucking dogs disposed towards each other by the advancement of said chucking nut on said reciprocating member.

References Cited by the Examiner

UNITED STATES PATENTS

| 577,091 | 2/1897 | Wetzel | 74—57 |
| 1,866,529 | 7/1932 | Farkas | 143—68 |
| 2,087,018 | 7/1937 | Carter | 143—68 |
| 2,436,692 | 2/1948 | Greene | 74—57 |

DONALD R. SCHRAN, *Primary Examiner.*